United States Patent [19]

Levien

[11] Patent Number: 5,291,310

[45] Date of Patent: Mar. 1, 1994

[54] SCREEN GENERATION FOR HALFTONE SCREENING OF IMAGES

[76] Inventor: Raphael L. Levien, P.O. Box 31, McDowell, Va. 24458

[21] Appl. No.: 753,893

[22] Filed: Sep. 3, 1991

[51] Int. Cl.$^5$ ............................................. H04N 1/40
[52] U.S. Cl. .................................. 358/456; 358/465; 358/466; 358/500
[58] Field of Search ............... 358/400, 401, 429, 452, 358/455, 456, 457, 458, 465, 466, 75, 80, 296, 298, 77, 451; 101/211; H04N 1/40

[56] References Cited

U.S. PATENT DOCUMENTS 4,852,485 8/1989 Brunner ............................... 101/211

*Primary Examiner*—Edward L. Coles, Sr.
*Assistant Examiner*—Jerome Grant, II
*Attorney, Agent, or Firm*—Allan Jacobson

[57] ABSTRACT

A halftone screen pattern generation system for computing halftone screened images with rotated screens including multiple angle and ruling combinations, including irrational tangent angles, is disclosed. A screen pattern is generated by storing a plurality of strips from an ideal angled screen pattern, and then concatenating a sequence comprising a selected order of the plurality of strips in a sequence. The error between the actual generated screen and ideal desired screen is computed. Each subsequent strip is selected from the plurality of strips so as to reduce the accumulated error. In one embodiment, a screen pattern is generated by storing one strip of an ideal angled screen pattern, and then concatenating a selected sequence comprising the strip and substrips of the strip. In accordance with another aspect of the present invention, the measure of error between the actual generated screen and the ideal angled screen is the length of a vector in a transformed UV space between the actual screen sample point and the idealized screen sample point. The error is determined by vector addition of the accumulated error, from strip to strip, which is added to the present error contribution from the present strip.

32 Claims, 8 Drawing Sheets

SCREEN GENERATION FOR HALFTONE SCREENING OF IMAGES

FIELD OF THE INVENTION

This invention relates to the halftoning of photographic images using screen patterns, and more specifically to the generation of screen patterns with precisely controlled angles and rulings.

BACKGROUND OF THE INVENTION

Images are typically stored in a memory representing tone values for each pixel of the original image. For a black and white image, the stored pixels represent the gray scale value corresponding to each pixel. For a color image, each color plane is stored as an array of pixels each representing the tone value for each pixel of the image in each respective color plane. For example, if each of the pixels of a black and white image is represented by a 8 bit digital word, then the tone value for a given image pixel may be one of 256 values between the black level and the white level.

Continuous tone images do not print well on most printing devices where typically the absence or presence of the ink on the paper is used to represent the printed image. In order to represent halftones (shades between the presence or absence of the printed ink), the original image is screened to produce a pattern, such as a variable size dots which appear to the human eye as a halftone image.

In order to prepare a photograph for printing, it is first necessary to perform the step of halftone screening, which converts the continuous gray shades of the original into dots of varying size and shape. Typically, these dots are arranged on a regular grid of approximately 100 dots per inch. This spatial frequency is known as the screen ruling. Thus, one square inch of the final printed photograph will be composed of approximately 10,000 dots.

Screening to produce halftone images is well known. The screen consists of an array of dots, or halftone cells, each of which represents one section of continuous tone in the original image as a single dot of variable size and shape. A halftone cell, in turn, consists of an array of smaller screen pixels, or samples, each having individual values against which the input pixels derived from the original image will be compared. The individual values of the smaller screen pixels, or samples, of the repeating halftone cell which form the variable dots is referred to herein as a spot function.

The halftone screening step consists of a screen pattern generating step, and a comparison step between the input image and the screen pattern. The screen is usually stored as a fairly small pattern that repeats itself or is repeatedly generated by programming. At any point where the original image is greater than the screen pattern, the output is marked. At any point where the image is not greater than the screen pattern, the output is not marked. In other words, if the value of the image pixel is greater than corresponding value of the screen cell, a mark is generated by the marking engine, whereas if the value of the image pixel is less or equal to the screen cell value, then no mark is generated by the marking engine, or vice versa. In this way, the final screened image, composed of dots, is produced.

In color printing, there are four separate steps of halftone screening, one each for the cyan, magenta, yellow, and black inks. It is advantageous to angle the halftone grid differently for each of the four planes. For example, the most common practice is to angle the cyan dots by 15 degrees, magenta by 75 degrees, yellow by 0 (or 90) degrees, and black by 45 degrees. If these angles are adhered to precisely, as well as the screen ruling being precisely identical for all four planes, then optimum results are achieved.

Precise screen angles can be achieved quite easily in photomechanical systems by simply rotating the photographic screen carrier. However, when the image is processed electronically, and the screened image is to be produced by a digital raster scan recording device, the problem becomes much more difficult. Rational numbers, which can be represented as the ratio of two integers, are relatively easy to accurately represent in a digital computer. Irrational numbers, which cannot be represented as the ratio of two integers, are much more difficult to accurately represent in a digital computer or any digital device. The tangent of a 15 or 75 degree angle is an irrational number. Therefore, screens of 15 and 75 degrees can be expected to be difficult to generate in a digital device. Also, irrational screen rulings where the number of pixels per screen cell is not a rational number can be expected to be difficult to accurately reproduce in a digital computer.

Prior art techniques fall into two classes. In the first class, the angles can be approximated, but not achieved precisely. These techniques are known as rational tangent angle techniques, because the screen angles are limited to arctangents of rational numbers. As a result of the inaccuracy of the screens angles and rulings, objectionable moire patterns result. A method exemplary of this technique is taught in U.S. Pat. No. 4,149,194 (Holladay). The screen pattern is represented by a strip of pixels. To generate the screen pattern, this strip is repeated across the width of the image. To angle the screen pattern, this strip is shifted by a certain number of pixels each scan line. An advantage of this technique is that it is very fast. Another advantage is the relatively modest memory requirement for the screen.

In the second class of screen generating techniques, precise angles and rulings can be achieved, but only at the cost of a large amount of computation for each pixel. This technique is described in U.S. Pat. Nos. 4,499,489 (Gall) and 4,350,996 (Rosenfeld). The device coordinate system is represented by XY space, and a halftone cell in the screen to be printed is represented by a vector in UV space, i.e. the coordinate system of the rotated screen. For each pixel, the position of the pixel in XY space is transformed into UV space. The screen pattern for that point can be determined by applying the spot function to the UV coordinates.

Although Gall and Rosenfeld describe certain speed optimizations, the disclosed technique requires many more operations per pixel than do rational angle techniques, and therefore the speed is inferior. Another technique for generating accurate screen angles is described in European Patent 0 427 380 A2 (Schiller). The Schiller patent describes a rational tangent angle method that can achieve fairly accurate screens at the cost of requiring a substantial amount of memory, typically on the order of hundreds of thousands of words.

The present invention uses a novel technique which has the high speed and low memory requirements of a rational tangent method yet produces halftone screens with the precision of irrational angles. The present invention provides a method for implementing a halftone screen pattern generation system for rotated screens including multiple angle and ruling combinations, and to produce a screened image formed with a rotated screen on a digital raster output device. In addition, the present invention provides a method of computing halftone screened images that can be made to work very quickly when implemented as a computer program, requires a relatively small amount of memory, and minimizes the number of cache misses when implemented as a computer program running on a computer incorporating a cache.

SUMMARY OF THE INVENTION

The method of the present invention can be practiced in a system including a scanner, a computer, and a raster scan output device. An original image is optoelectronically scanned and stored in memory. The image to be reproduced is divided into picture elements, or pixels, of a size suitable for halftone reproduction. On reproduction, each halftone dot is printed as a combination of smaller picture elements.

A halftone screened image is produced by (a) retrieving the pixel of the stored image pixel that corresponds to the present output pixel, (b) generating one pixel of the screen pattern, (c) comparing the image pixel and screen pixel, and (d) marking or not marking the output pixel on the basis of which was greater. The process is repeated for every output pixel. The sequence of output pixels is a raster scan, i.e. one horizontal scan line sequence of pixels followed by another horizontal scan line of pixels, which is the standard sequence for most image processing systems. The key problem solved by the present invention is to accurately generate the screen pixels in raster scan sequence with a minimum of computational effort.

In accordance with the present invention, a screen pattern is generated by storing a plurality of strips from an ideal angled screen pattern, and then concatenating a sequence comprising a selected order of the plurality of strips in a sequence. To begin, a predetermined first strip is chosen. At the end of the first strip, the error between the actual screen and ideal desired screen is computed. A next strip is selected from the plurality of strips so as to reduce tee accumulated error. At the end of the second selected strip (which could in the general case, be the same as the first selected strip), the error between the actual screen and the ideal desired screen is again computed, and a next strip selected so as the reduce the accumulated error, and so on until the end of the scan line is reached. Any screen values in the last selected strip left over when the end of the scan line is reached, are discarded. At the beginning of the next scan line, a new first strip is selected from the plurality of strips so as to minimize the accumulated error between the actual screen and the ideal desired screen.

In accordance with a preferred embodiment of the present invention, a screen pattern is generated by storing one strip of an ideal angled screen pattern, and then concatenating a selected sequence comprising the strip and substrips of the strip. The strip, on the order of hundreds of pixels long and one pixel high, typically extends over many halftone cells (not necessarily an integer number of halftone cells). In the specific embodiment, there are three possible strip and substrip combinations. One selection is the entire strip, and the other two are individual substrip lengths that begin at two different points in the strip and continue to the end of the strip. The use of substrips as part of a larger strip is strictly for reasons of economy, and in general, a plurality of individual strips of an ideal angled screen pattern may be used. Therefore, in the following discussion, both the larger strip and the substrips may be simply referred to as strips.

At the beginning of each scan line, a starting point is determined within the strip. (The first line usually begins with the first pixel of the strip). Then, screen pattern values are read out in sequence until the end of the strip is reached. At this point, one of three possible starting points in the strip, i.e. the original strip or one of the two substrips, is selected. The reading out of screen pattern values continues from the selected point in the strip, until the end of the strip is again reached. A new starting point in the strip, out of the three possible starting points, is selected and the process repeats, until the end of the scan line is reached. Thus, it can be seen that the final generated screen pattern is a sequence composed of three strips: the original strip and two substrips.

At the end of the scan line, one of any of the points in the original strip (not necessarily the same as the two points which form the above two substrips) is selected as the starting point for the next scan line. The new starting point is also selected so as to minimize accumulated error in generating the ideal desired screen. In order to minimize the number of substrips which must be examined for minimum error, 16 possible points are predetermined as 16 possible starting points. In this regard, the selection of 1 of 16 points in the original strip at the beginning of each line corresponds to having 16 individual strips (or substrips).

Both the selection of the 1 of 16 starting points, and the selection of substrips along a scan line, is made so as to ensure that the resulting screen pattern is precisely the desired angle and ruling. This can be described in terms of making each selection so as to minimize the deviation from the ideal, also known as error. The decision as to which of the three starting points is to be selected at the end of a strip requires only two comparison and two addition operations. Since the next strip selection need be done approximately one in every several hundred pixels, the present invention can be implemented as an extremely fast computer program.

In accordance with another aspect of the present invention, the measure of error is the length of a vector in a transformed UV space between the actual screen sample point and the idealized screen sample point. The error arises because the strip is less than the entire length of the image screen. Although the first strip of the first scan line may be chosen to have no error, after more than one strip has been concatenated, the error is non-zero. Thereafter, the error is determined by vector addition of the accumulated error, from strip to strip, which is added to the present error contribution from the present strip. Similarly, the error is determined by vector addition of the accumulated error, from scan line to scan line, which is added to the present error contribution from the present scan line.

DETAILED DESCRIPTION OF THE INVENTION

Figure 1:
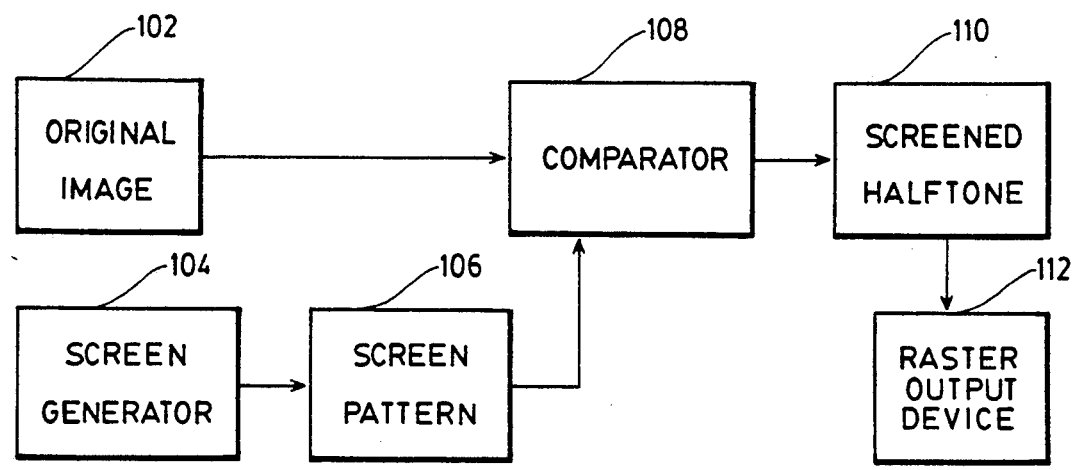
FIG. 1 shows a block diagram of a halftoning system utilizing the present invention.

The purpose of the present invention is to produce screened halftones from original images. Referring to FIG. 1, an original image source 102 is photomechanically scanned or otherwise prepared for reproduction in digital form, at which point it is presented to digital comparator 108. Although screening is described as a comparison operation between an input image and a screen pattern, it is to be understood that other operations between an input image and a screen pattern, such as multiplication, also qualify as a "screening" operation.

A screen generator 104, preferably implemented as a program running on a digital computer, produces screen pattern 106, which is also presented to comparator 108. Both the original image 102 and the screen pattern 106 are composed of tiny sub-areal regions known as pixels, each of which represents a single gray shade.

Comparator 108 performs a pixel-by-pixel comparison of the original image 102 and the screen pattern 106. At pixel locations where the pixel from original image 102 is greater (i.e. a darker shade of gray) than the corresponding pixel from the screen pattern 106, the corresponding pixel in the screened halftone 110 is marked. At all other pixel locations, the screened halftone 110 is not marked, or alternatively, is marked a different way or with a different color.

The resulting screened halftone 110 is composed of dots of varying size and shape, each of which is composed of a number of pixels. Screened halftone 110 is then conveyed to raster output device 112, at which point it is recorded on photographic film or other image forming means.

Figure 2:
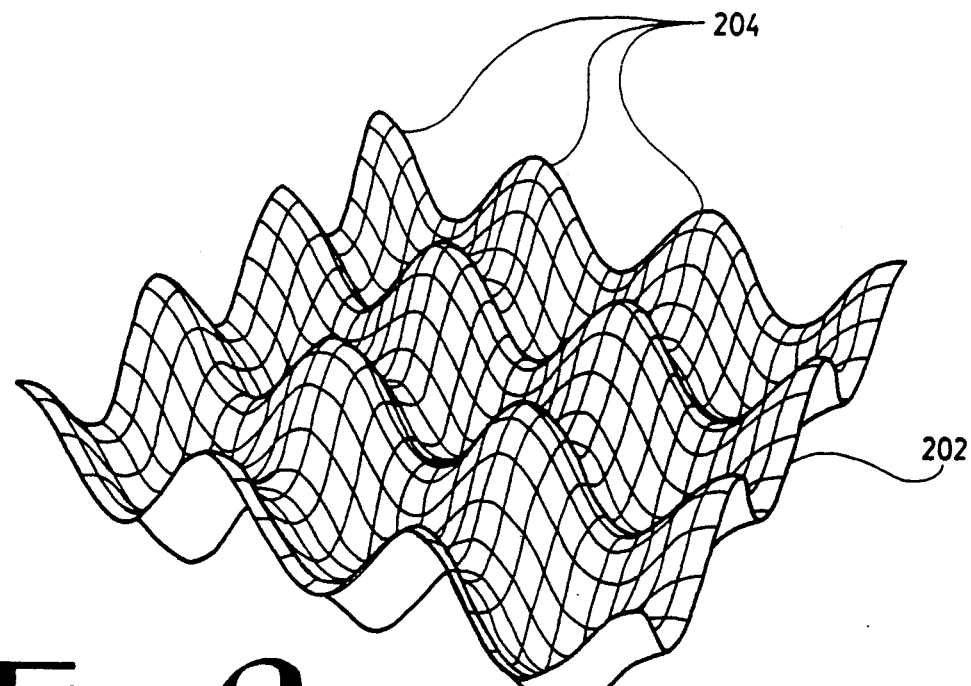
FIG. 2 shows the screen pattern as a three dimensional plot which may be used in conjunction with the present invention.

FIG. 2 shows a section of screen pattern 106 depicted as a surface in three dimensions. The grid squares represent individual screen pixels, while the height of each grid square represents the gray shade of the screen pattern at that pixel. Peak 204 represents a maximum gray shade; between peaks 204 are minimums representing minimum gray shades. A section through the surface in FIG. 2 will depict the spot function, which is roughly illustrated as a sine wave in the figure.

Figure 3:
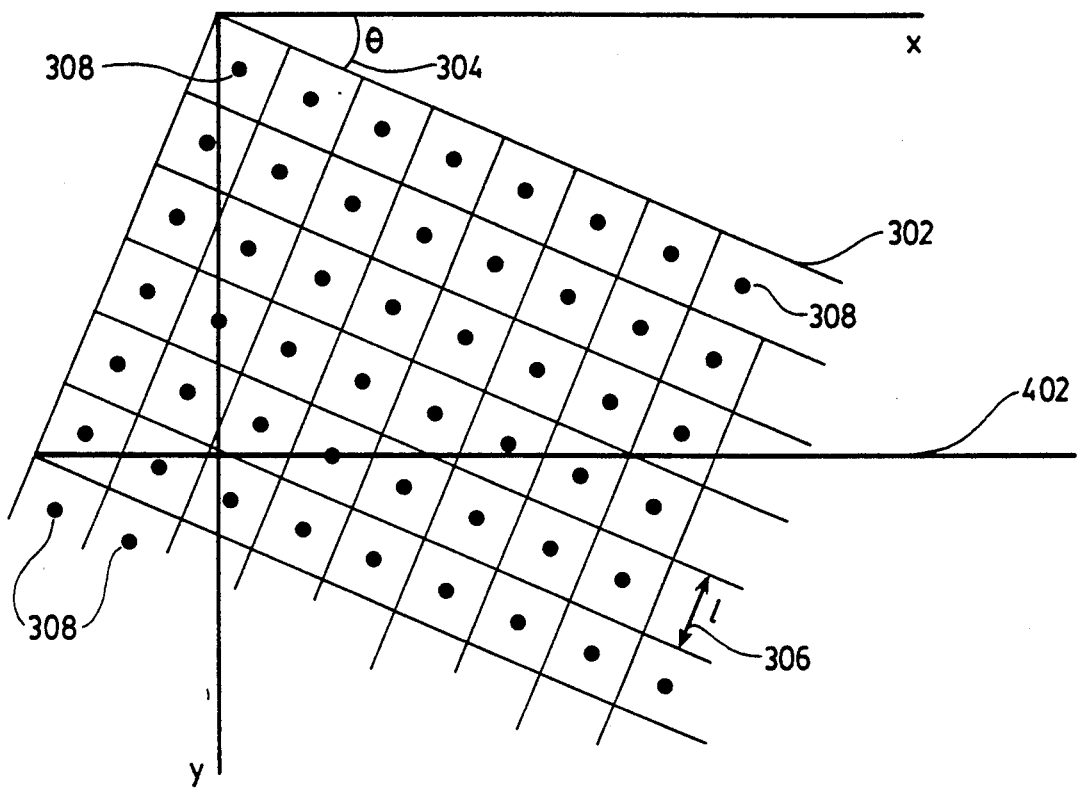
FIG. 3 shows the relation of the screen grid and the strip to the output device coordinates in accordance with the present invention.
Figure 4A:
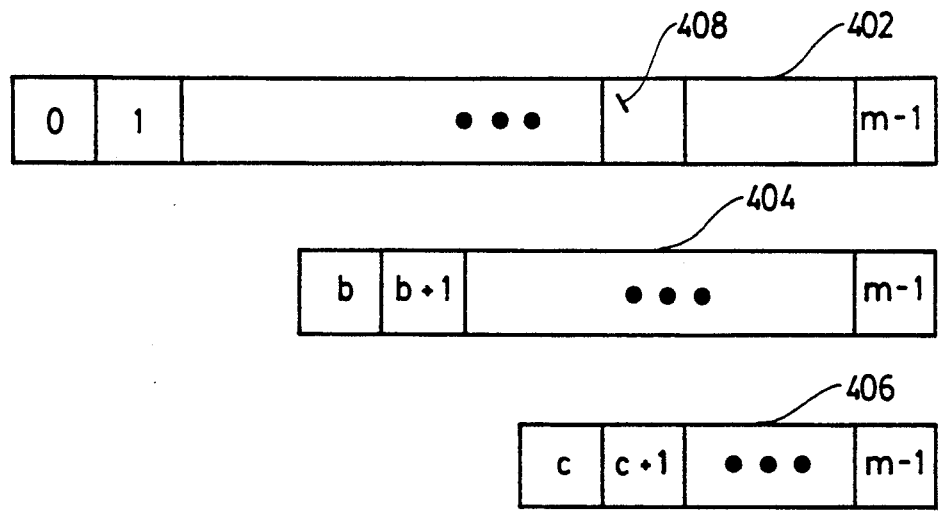
FIG. 4a shows the strips of screen data used to practice the present invention.

FIG. 3 shows a representation of screen pattern 106. Dots 308 represent peaks of the screen pattern, corresponding to peaks 204. Such dots are positioned according to grid 302, which is rotated by angle 304 from the coordinate axes, and with spacing 306. The inverse of spacing 306 is the screen ruling of screen pattern 106. In general, spacing 306 and the tangent of angle 304 may be rational or irrational numbers. The present invention utilizes a strip, 402, one pixel high, taken from an ideal angled screen. As shown in FIG. 4a, the generated screen pattern is composed of strips 402, and strips 404 and 406, which are substrips of strip 402.

Figure 4B:
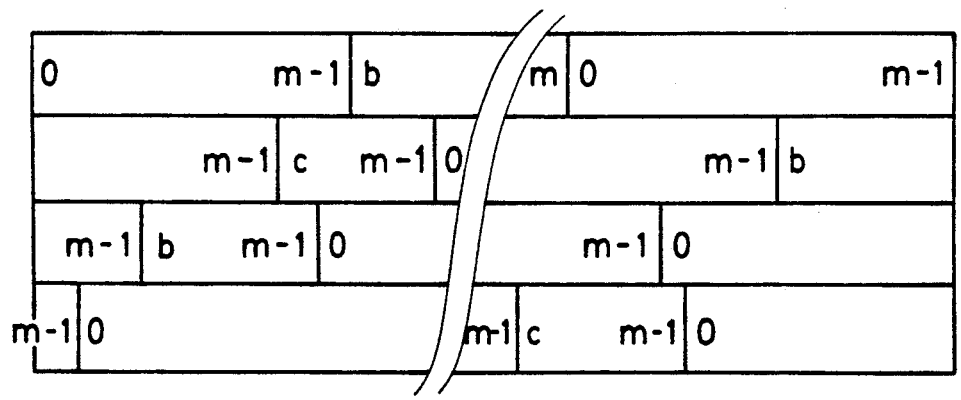
FIG. 4b shows a resulting screen pattern composed of such strips in accordance with the present invention.

Specifically, strip 402 is composed of m pixels, numbered from 0 to m−1. Strip 404 is composed of m−b pixels, numbered from b to m−1. Strip 406 is similarly composed of m−c pixels, numbered from c to m−1. Each pixel represents a gray shade value, corresponding to a pixel of the screen pattern. Strips 404 and 406 contain the same gray shade values as strip 402 for like numbered pixels. Therefore, strips 404 and 406 can be generated by selectively addressing strip 402 from different beginning points. An example of a portion of a screen generated by concatenating strips 402, 404 and 406 in a given sequence, is shown in FIG. 4b.

The optimum values of m, b, and c depend on the screen angle and ruling. In one embodiment, in which the screen ruling is 133 lines per inch, the output resolution is 1016 pixels per inch, and the screen angle is 15 degrees, the preferred values of m, b, and c are 443, 119, and 206, respectively. By way of example, strip having 443 pixels with 7.6390977 pixels per cell covers 57.99 screen cells. A procedure for determining optimum values of m, b, and c is described in section 1, entitled "Determining the optimum values of m, b, and c."

Figure 5:
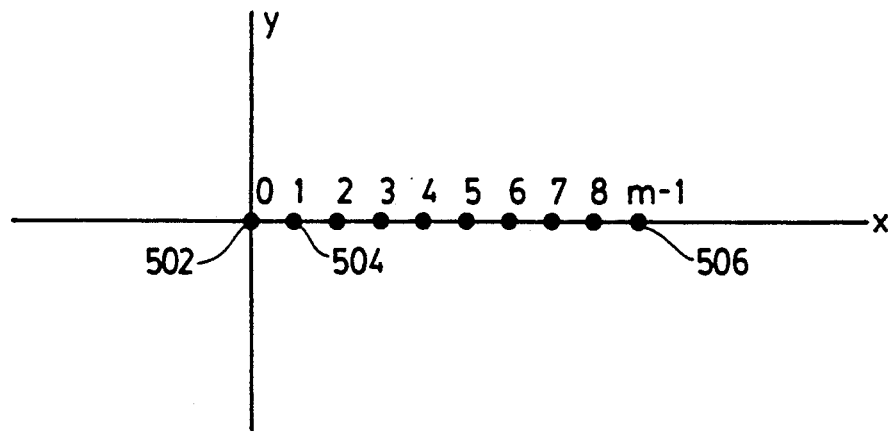
FIG. 5 shows a sequence of points (0,0) through (m−1,0) in XY space used to calculate the error function in accordance with the present invention.

The strip 402 is typically implemented using a random access storage device, such as a RAM. Each pixel in strip 402 is represented by one word of memory in this storage device. The contents of this memory are determined, according to a procedure detailed below, before the screening process is initiated. FIG. 5 shows the m points in XY space corresponding to the m pixels in the strip 402. The XY coordinate system is the one used by raster output device 112. Thus, it is also referred to as 'device coordinate space.' The points 502, 504, and 506 are given the XY coordinates (0,0), (1,0), and (m−1,0), respectively.

Figure 6:
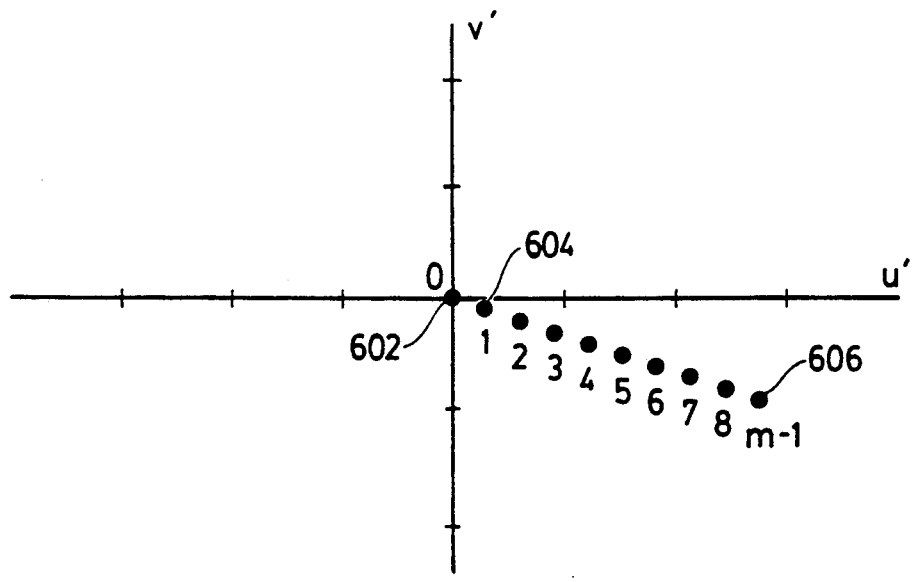
FIG. 6 shows the sequence of points (0,0) through (m−1,0) transformed into U'V' space used to calculate the error function in accordance with the present invention.

FIG. 6 shows the points of FIG. 5 transformed into U'V' coordinate space. The transformation consists of a scaling operation and a rotation operation. Point 602 is the XY point (0,0) transformed into U'V' space, point 604 is the XY point (1,0) transformed into U'V' space, and point 606 is the XY point (m−1,0) transformed into U'V' space. The U'V' coordinates of a point are determined mathematically from the XY coordinates according to the following equations:

$$u' = \frac{\text{resolution}}{\text{ruling}} * (x * \cos\theta - y * \sin\theta) \quad (1)$$

$$v' = \frac{\text{resolution}}{\text{ruling}} * (x * \sin\theta - y * \cos\theta)$$

where resolution is the spatial resolution of raster output device 112, ruling is the desired screen ruling, and theta is the desired screen angle.

Figure 7:
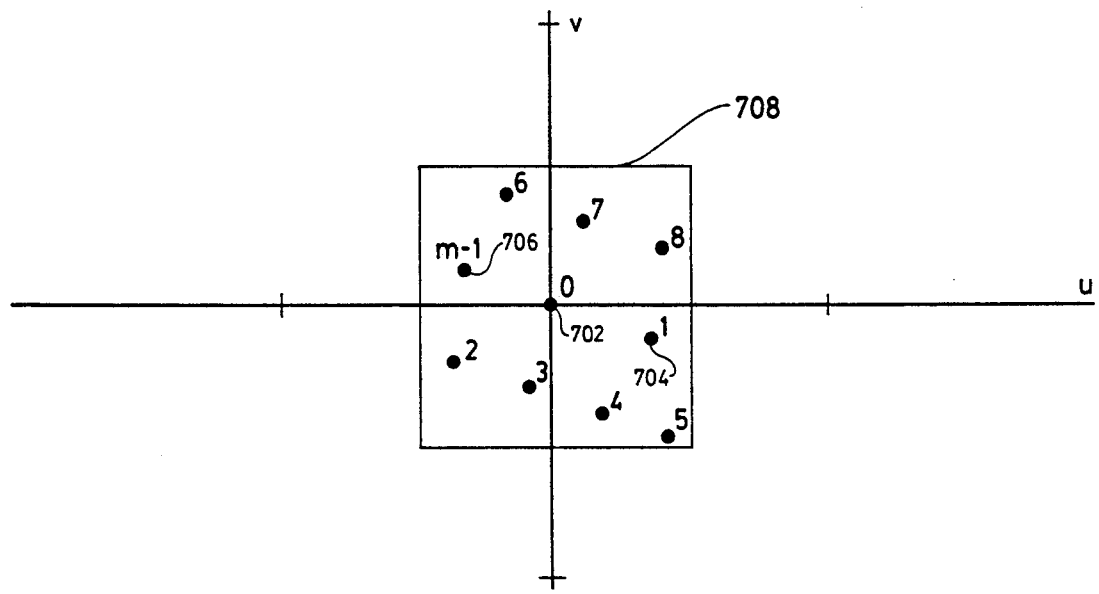
FIG. 7 shows the sequence of points (0,0) through (m−1,0) transformed into UV space used to calculate the error function in accordance with the present invention.

After transformation into U'V' space, points 602, 604 ... 606 are again transformed into UV space. The result of this transform is shown in FIG. 7, where the points 702, 704 ... 706 are the transformed counterparts of points 602, 604 ... 606, respectively. This transformation, which amounts to a "wrapping around of the edges" of the square 708 bounded by the UV coordinates (−0.5,−0.5) and (0.5,0.5), is described mathematically by the equations:

$$u = u' - \text{round}(u') \quad (2)$$

$$v = v' - \text{round}(v')$$

where, for any real x, round(x) is the integer nearest x.

One important property of this transformation into UV space is that two distant points in XY space may be transformed into two points in very close proximity in UV space. Then, the values of the strip 402 pixels may be determined by applying to spot function to the UV coordinates. One such useful spot function is given by $$\frac{1 + \cos(2 * pi * u) + \cos(2 * pi * v)}{2} \quad (3)$$

The above spot function produces a peak at the center of square 708, and a minimum value at the corners of square 708. One skilled in the art will recognize that many other spot functions may be used with the present invention. Different spot functions will result in differently shaped dots in screened halftone 110. In short, the value of a pixel 408 in strip 402 is determined by transforming its corresponding XY coordinate into U'V' space, then further transforming this point into UV space, and finally applying the spot function to the coordinates of point 702. It is possible at this point to perform further processing before using strip 402 in accordance with the present invention to generate a halftone screen. One example is to replace the gray scale values in strip 402 with a uniform distribution of gray values that are still in the same order.

1. Determination of the values of m, b, and c

There are a number of values for the parameter m that will give acceptable results. A value of m is a valid choice if the point obtained by transforming the XY point (m,0) into UV space is closer to the UV point (0,0) than for any smaller integer value of m that is still greater than zero. The smoothness of the dots in screened halftone 110 varies proportionally with the value of m. In general, the preferred value of m is the value that meets the above condition that is closest to 2*(resolution/ruling) 2. It will be recognized that a smaller value may give satisfactory results and require less memory, and that a larger value may give superior results at the cost of an increased memory requirement.

One motivation for choosing a compromise value for m may be choose the largest value which will still allow strip 402 to fit entirely within the cache memory of the computer used to implement screen generator 104, thus greatly speeding the retrieval of pixel values from strip 402.

The value of the parameter b is determined in similar fashion. The value of b is the integer, greater than 0 but less than m, such that the point obtained by transforming the XY point (b−m,0) into UV space is closer to the UV point (0,0) than for any other such value of b.

The value of the parameter c is the integer, again greater than 0 and less than m, and that the triangle formed by the points obtained from transforming the XY points (0,0), (b,0), and (c−m,0) into UV space encloses the point obtained by transforming the XY point (m,0) into UV space, and that the point obtained by transforming the XY point (c,0) into UV space is closer to the UV point (0,0) than for any other such value of c.

Figure 8:
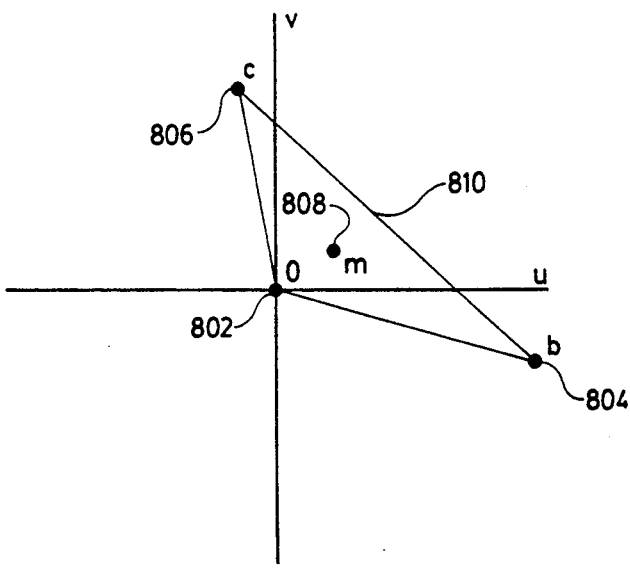
FIG. 8 shows the points corresponding to 0, b, c, and m in UV space in accordance with the present invention.

These relations are depicted graphically in FIG. 8. Point 802 corresponds to the XY point (0,0) transformed into UV space. Similarly, points 804, 806, and 808 correspond to the XY points (b,0),(c,0), and (m,0) transformed into UV space. Point 808 is the point m following the last point m−1 of the strip 402 which began with point (0,0). The points 802, 804, and 806 form a triangle 810 that encloses point 808. Further, triangle 810 is the smallest such triangle, or very nearly so.

2. Generation of a scan line of the screen pattern

The first m pixels in the first scan line of screen pattern 106 are generated by successively reading out the contents of strip 402. These pixels correspond precisely to a screen pattern derived from direct calculation of the spot function. However, for all other pixels in screen pattern 106, there is no pixel stored in the strip 402 that corresponds precisely to the values obtained from direct calculation of the spot function. It is the aim of the present invention, however, to select pixels from the strip 402 that are very close in UV space to the ideal of the XY coordinates of screen pattern 106 transformed into UV space, thus resulting in screen pixel values very close to the ideal screen pixel values.

In order that the deviations from ideal do not accumulate and cause an imprecise screen angle or ruling, an error vector value is attached to each pixel in screen pattern 106. This error vector represents the difference of the actual point in UV space corresponding to the pixel retrieved from strip 402 from the ideal point obtained by transforming the present XY coordinates into UV space. Mathematically, if the present pixel is identified by the coordinates (x,y) and the present pixel address within strip 402 is identified by k, then the error is the UV vector obtained by transforming the XY vector (x,y)−(k,0) into UV space.

If the present pixel (x,y) in screen pattern 106 is retrieved from address k in strip 402, when k is less than m−1, then the next pixel (x+1,y) is retrieved from address k+1 in strip 402 without any change of the error vector. It is only when k is the last address in strip 402, i.e. equal to m−1, that this technique will not work, and a new value of k must be chosen. At these times, the new value of k is chosen from three alternatives: 0, b, and c, in such a way as to minimize the magnitude of the error vector that would result from this choice.

One method to select the new value of k is to directly calculate the error vector for each of the three alternatives, then select the alternative that resulted in the smallest magnitude of the error vector. This method is practical, but leads to a higher computational burden than necessary.

A different method, which is the best known at this time for use in accordance with the present invention, produces the same results with far less computation. In this method, the error vector is stored in transformed form in storage registers eb and ec. One skilled in the art will recognize from the following that the nature of this transform is an affine transform. The affine transform is chosen, so that the maximum of the three values 0, eb, and ec, corresponds to the minimum magnitude of the resulting error vector corresponding to a choice of 0, b, and c. After the new value of k is selected, the storage registers eb and ec are updated to reflect the new error vector. The requisite transform can be determined according to the following steps.

Figure 9:
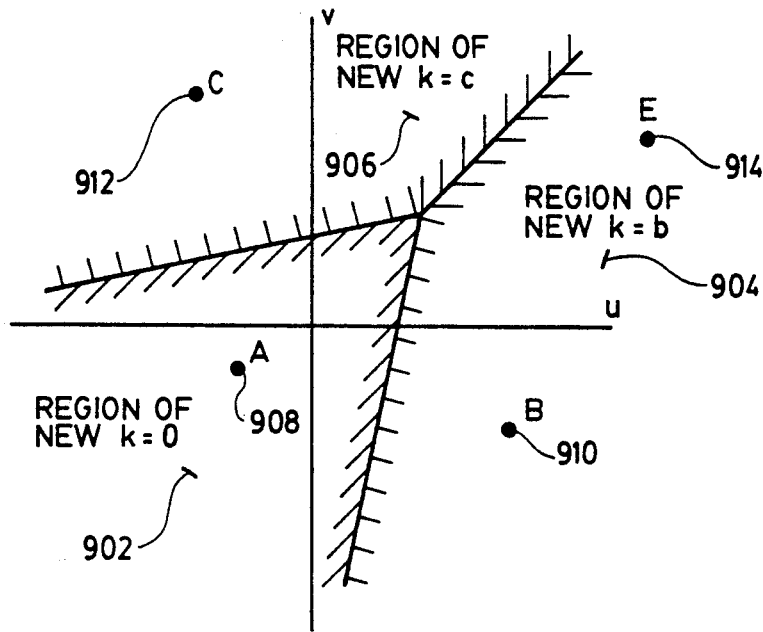
FIG. 9 shows the division of UV space into three regions corresponding to choices for the value k used to select the next strip in the generated screen in accordance with the present invention.

Referring to FIG. 9, point A 908 is the point obtained by transforming the XY point (−m,0) into UV space. Similarly, point B 910 is the point obtained by transforming the XY point (b−m,0) into UV space. Finally, point C 912 is the point obtained by transforming the XY point (c−m,0) into UV space. Also, point E 914 is the error vector for the present pixel. While points A 908, B 910, and C 912 are fixed, the position of point E 914 varies with each output pixel.

If, for the example shown in FIG. 9, 0 is chosen as a new value for k, the new error vector would be E−A. Similarly, if b is chosen, the new error vector would be E−B. Finally, if c is chosen, the new error vector would be E−C. The problem of determining which of these new error vectors has the least magnitude is equivalent to determining whether point E 914 is closest to point A 908, point B 910, or C 912.

Thus, the UV plane of FIG. 9 is divided into three regions 902, 904, and 906. Region 902 comprises all values of E 914 for which 0 is to be chosen as the new value of k. A point is included in region 902 if and only it is closer to point A 908 than points B 910 and C 912. Similarly, region 904 comprises all values of E 914 for which b is to be chosen, and includes points closer to point B 910 than points A 908 and C 912. Finally, region 906 comprises all values of E 914 for which c is to be chosen, and includes points closer to point C 912 that points A 908 and B 910.

The dot product (E−A) * (E−A) is equal to the square of the magnitude of the new error vector if 0 is chosen for a new value of k. Similarly, the dot product (E−B) * (E−B) is equal to the square of the magnitude of the new error if b is chosen. Finally, the dot product (E−C) * (E−C) is the square of the magnitude of the new error vector if c is chosen. It can thus be seen that the minimum magnitude of the error vector can be determined by selecting the alternative associated with the least dot product.

In accordance with the present invention, the error vector is represented by the values of the storage registers eb and ec, which can be determined from the value of E 914 thus:

$$eb = (E - A) * (E - A) - (E - B) * (E - B) \quad (4)$$

$$ec = (E - A) * (E - A) - (E - C) * (E - C)$$

It will be recognized by one skilled in the art that if eb and ec are both negative, then (E−A) * (E−A) is the smallest of the three dot products and 0 is thus the best choice for the new value of k. Similarly, if eb is positive and greater than ec, then (E−B) * (E−B) is the smallest, and b is the best choice. Finally, if ec is positive and greater than eb, then (E−C) * (E−C) is the smallest, and c is the best choice.

Equations (4) can be algebraically simplified thus:

$$eb = 2(B - A) * E + A * A - B * B \quad (5)$$

$$ec = 2(C - A) * E + A * A - C * C$$

Figure 10:
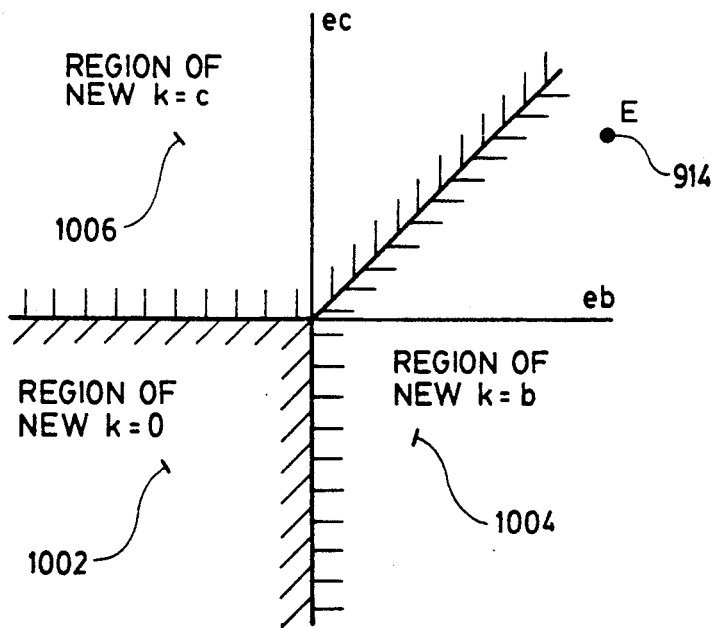
FIG. 10 shows the division of (eb,ec) space into three regions corresponding to choices for the value k used to select the next strip in the generated screen in accordance with the present invention.

Referring to FIG. 10, the plane formed by values (eb,ec) is divided into regions 1002, 1004, and 1006. If E 914 falls within region 902, then (eb,ec) will fall into region 1002, with both eb and ec negative. Similarly, if E 914 falls within region 904, then (eb,ec) will fall within region 1004, with eb positive and greater than ec. Finally, if E 914 falls within region 906, then (eb,ec) will fall within region 1006, with ec positive and greater than eb.

Upon initialization, E 914 is zero. Therefore, the initial values ebi and eci of eb and ec, respectively, are determined thus:

$$ebi = A * A - B * B \quad (6)$$

$$eci = A * A - C * C$$

Also, at times when k is less than m−1, the new value of k is k+1, and the error E 914 does not change. Therefore, eb and ec do not change while a screen pattern is being generated from sequential pixels within a strip. Further, at times when k is equal to m−1, at the end of a strip, the new value of k is one of 0, b, and c. When the new value is chosen to be 0, the error E 914 becomes E−A. The values of eb and ec are updated to reflect the new value of E 914, by adding eba to eb, and adding eca to ec, where eba and eca are determined thus:

$$eba = 2 A * (A - B) \quad (7)$$

$$eca = 2 A * (A - C)$$

Similarly, when the new value of k is chosen to be b, E 914 becomes E−B, and ebb is added to eb and ecb is added to ec, where $$ebb = 2 B * (A - B) \quad (8)$$

$$ecb = 2 B * (A - C)$$

Finally, when the new value of k is chosen to be c, E 914 becomes E−C, and ebc is added to eb and ecc is added to ec, where $$ebc = 2 C * (A - B) \quad (9)$$

$$ecc = 2 C * (A - C)$$

It should be noted that, although the embodiment described herein selects from three alternatives, other embodiments are desirable that incorporate two alternatives, or four or more alternatives. In each case, the number of storage registers used to encode the error vector (such as eb and ec) is one less than the number of alternatives. It will be obvious to one skilled in the art, how to adapt the present invention to a different number of alternatives other than three.

3. Choosing a starting pixel address at the beginning of a scan line

At the beginning of each scan line, a pixel address of strip 402 is chosen, in such a way as to minimize the resulting error. This pixel address is used to generate the first pixel of the scan line in screen pattern 106. More specifically, for the first pixel of scan line y, an address k is chosen so as to minimize the magnitude of the error vector obtained from transforming the XY vector $(0,y)-(k,0)$ into UV space.

For the first scan line, this value of k is zero, and the error is similarly zero. For other scan lines, some technique is needed to determine this value of k. One technique for determining this value of k is to search through all values of k, in the range of 0 through $m-1$, directly calculate the error vector for each of these values of k, and choose the value of k that resulted in the error vector with the least magnitude. Although this technique is practical, it requires more computation than necessary.

An alternative method, which is the best known for practice with the present invention, makes use of a number of tables to reduce the number of values of k that must be searched. It also makes use of the eu and ev storage registers to represent the u and v coordinates, respectively, of the error vector. Each of the tables contains nt values. Experiment has determined that a value of 16 for nt is sufficient.

The table jt[i] contains the nt values of j, ranging from $-(m-1)$ to $m-1$, such that the magnitudes of the vectors obtained from transforming the XY vectors $(0,1)-(j,0)$ are the nt least such magnitudes. The order of the values in jt[i] is immaterial. Further, the tables ut[i] and vt[i] contain the u and v coordinates, respectively, of the point obtained from transforming the XY point $(0,1)-(jt[i],0)$ into UV space. Assuming that the starting address of the previous scan line was ky, and the error vector was (eu,ev), the new value of k is determined to be ky+jt[i], where i meets the following conditions:

(1) The value of i is in the range of 0 through $nt-1$.
(2) The value of ky +jt[i] is in the range of 0 through $m-1$.
(3) The magnitude of the new error vector (eu+ut[i], ev+vt[i]) is the smallest such magnitude that meets conditions (1) and (2).

After the new value of k is chosen, the eu and ev storage registers are updated to hold eu+ut[i] and ev+vt[i], respectively. Theoretically, the error represented by eu and ev should be transformed into (eb,ec) space according to equation (5), and used as the initial error value for the scan line. However, it is simpler to initialize eb and ec with the values ebi and eci, respectively, which are determined according to equation (6). Further, it results in slightly smoother dot shapes in screened halftone 110. Thus, the preferred embodiment of the invention, initialized eb and ec to the same values at the start of each scan line.

4. Screens with Rational Tangent Angles and Irrational Ruling

The present invention, as described so far, relies on an even coverage of UV space by pixels in strip 402, as shown in FIG. 7. Even coverage is ensured by the use of irrational tangent screen angles, in particular the 15 degree and 75 degree angles used in color printing. However, even coverage of UV space is not obtained when using rational tangent screen angles, such as the 45 degree and 0 degree angles used in color printing. Rather, strip 402 encodes values that lie on a single line in UV space, for a 0 degree angle, or two lines for a 45 degree angle, or more for other rational tangent angles. The preferred solution is to use a plurality of strips 402, each corresponding to a different line (or group of lines) in UV space. The above-described method is then modified so that a choice is made of both strip and starting address for each scan line. Because the tangent is rational, only two alternatives are needed for k when the end of the strip is reached. With only two alternatives, the selection to minimize errors may be the well known Bresenham line drawing technique of minimizing errors.

The number of strips, n, is chosen so that the point obtained from transforming the XY point (0,n) into UV space comes nearer to the point (0,0) than for any smaller value of n. Further, the product m * n should be close to the value 2 * (resolution/ruling 2. In addition, for 0 degree angles, m and n should be equal, or nearly equal. For 45 degree angles, optimum results are obtained when m is approximately twice the value of n. In general, if the tangent of the screen angle is the ratio of two relatively prime integers i and j, then m should be approximately equal to n * (i 2+j 2). The value of the pixel numbered k in the strip numbered 1 can be determined by transforming the XY point (k,1) into UV space, then applying the spot function to the resulting coordinates.

The rational tangent screens of the present invention should be distinguished from those of other techniques, such as that described in Holladay (U.S. Pat. No. 4,149,194). In the present invention, screen patterns with any screen ruling can be generated with precision. In the prior art rational tangent techniques, rulings are restricted to values resolution/sqrt(i 2+j 2), where the tangent of the angle is i/j, for integer values of i and j.

Figure 12:
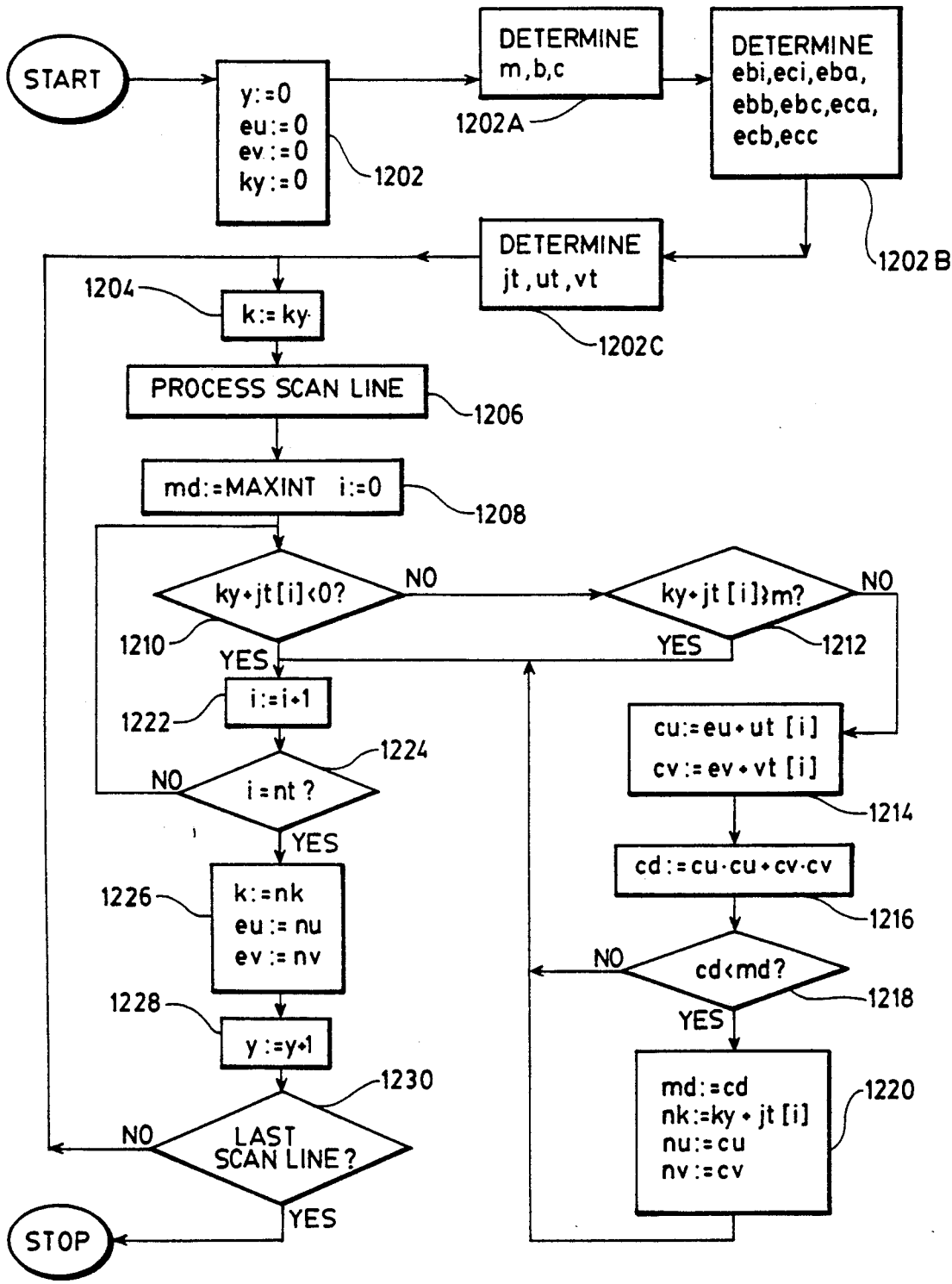
FIG. 12 shows a flowchart for sequencing through the scan lines in a preferred embodiment of the present invention.

One preferred embodiment of the present invention is as a software program running on a digital computer. FIG. 12 shows a flowchart for a software program implementing the present invention. Halftone screening of images in software is advantageous because of the availability of inexpensive standard hardware.

Figure 11:
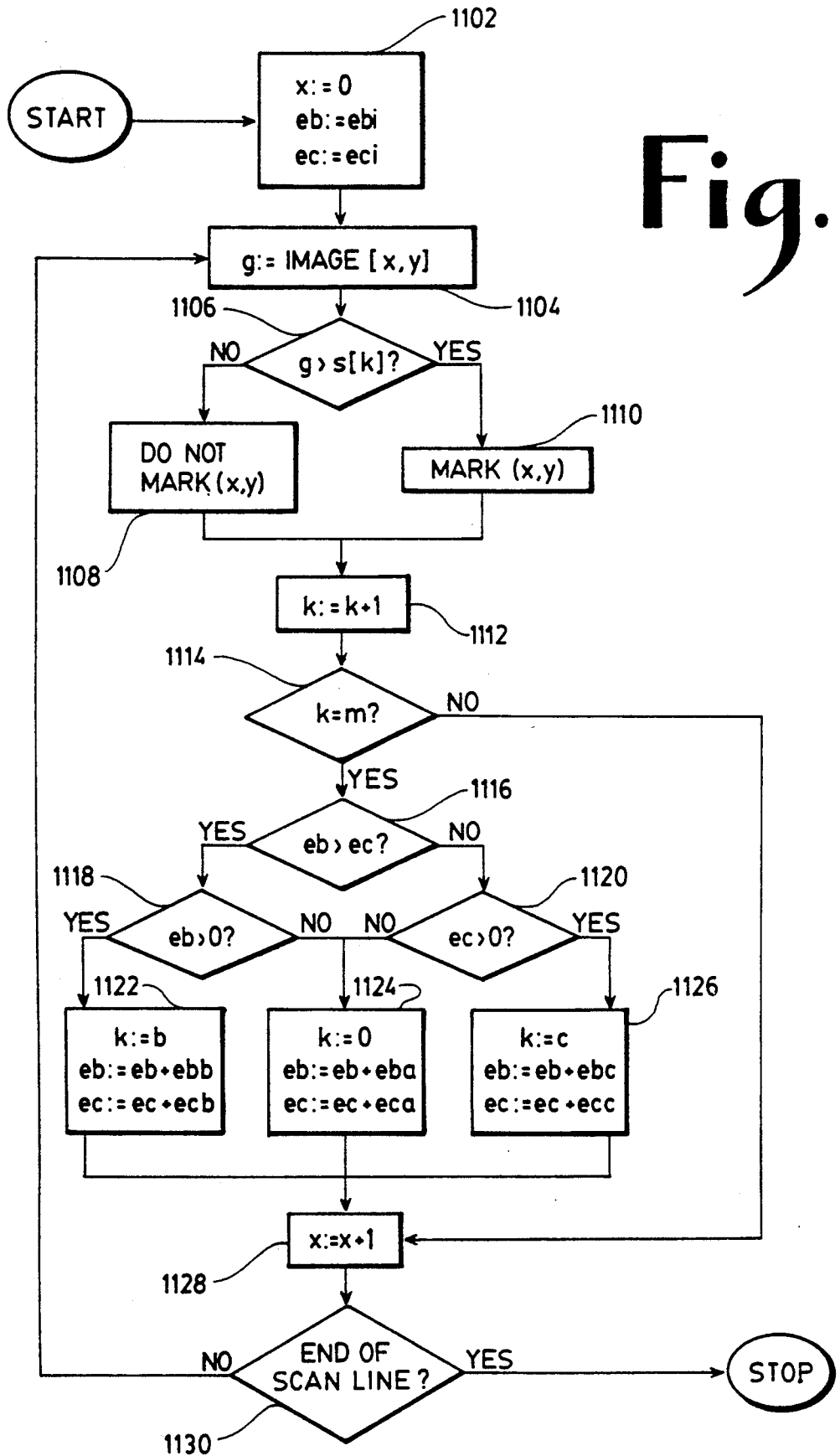
FIG. 11 shows a flowchart for processing a scan line in a preferred embodiment of the present invention.

In step 1202, the top scan line is designated as line zero, the error vector values of eu and ev are initialized to zero, and the starting address ky into strip 402 is initialized to zero. Also, initial values for m, b, and c are determined at step 1202A according to the description in section 1, herein; initial values for ebi, eci, eba, ebb, ebc, eca, ecb, and ecc are determined at step 1202B according to equations (6), (7), (8) and (9) herein; initial values for jt, ut, and vt are determined at step 1202C according to the description in section 3, herein. In step 1204, the pixel address k is initialized to the value of ky. Then, in step 1206, a scan line is processed. FIG. 11 shows a flowchart which processes a scan line. This flow chart represents the processing which is to be performed in step 1206.

The processing of the scan line in FIG. 11 begins with step 1102, which designates the first pixel in the scan line as pixel zero, and initializes the error values eb and ec to their initial values ebi and eci, respectively, which have been determined in step 1202B. In step 1104, the pixel corresponding to point (x,y) is retrieved from input image 102. This retrieval step may input a pixel value from a peripheral port connected to a scanning device. Alternatively, the retrieval step may perform a read operation on a storage means such as RAM or disk drive. In addition, the retrieval step may include additional image processing steps such as enlargement or rotation.

Then, in step 1106, the input image pixel value g is compared with the pixel in strip 402 corresponding to pixel address k. If the input image pixel g is greater, then pixel (x,y) of output image 110 is marked in step 1110. If input image pixel g is not greater, then the pixel (x,y) is not marked, or alternatively is marked a different color, in step 1108. In either of the two cases, pixel address k is incremented in step 1112. In step 1114, pixel address k is tested to determine if the end of strip 402 has been reached. If so, a new value of k is chosen in steps 1116 through 1126. In any case, the pixel coordinate x is incremented in step 1128 and tested to determine if the end of the line has been reached in step 1130. If so, the processing of the scan line has been completed.

If the end of the scan line had not been reached, then processing continues on the next pixel with step 1104, and the process repeats until the end of the scan line is reached. In the event that step 1114 determines that the end of strip 402 has been reached, a new value of k is chosen, beginning with step 1116, which compares error values eb and ec. If eb was greater, then eb is further tested to determine if it is positive in step 1118. If so, then the point (eb,ec) falls within region 1004 of FIG. 10, and processing continues with step 1122. In step 1122, k receives the value b, and eb and ec are updated by adding the values ebb and ecb, respectively, which are determined in step 1202B.

If, however, the test of step 1118 determines that eb is negative, then the point (eb,ec) falls within region 1002 of FIG. 10, and processing continues with step 1124. In step 1124, k receives the value 0, and eb and ec are updated by adding eba and eca, respectively, which are determined in step 1202B.

If the test of step 1116 indicated that ec was greater than eb, then ec is further tested to determine if it is positive in step 1120. If not, the point (eb,ec) falls within region 1002 of FIG. 10, and processing continues with step 1124. If, however, ec is positive, then the processing continues with step 1126. In function bock 1126, k receives the value c, and eb and ec are updated by adding ebc and ecc, respectively, which are determined in step 1202B.

When the processing of the scan line has been completed, processing continues with step 1208, which initializes index i to zero, and initializes previous least squared magnitude md to the largest possible integer that can be represented.

In step 1210, candidate pixel address ky+jt[i] is tested to determine if it is negative. If so, it is rejected immediately by skipping to step 1224. The table jt[i] is determined in step 1202C. In step 1212 candidate pixel address ky+jt[i] is similarly tested to determine if it is greater than or equal to the number of pixels in strip 402, m. If so, it is rejected by skipping to step 1224.

If the candidate pixel passed the tests of steps 1210 and 1212, then the resulting error is determined in step 1214 by setting candidate error values cu and cv to previous error values eu and ev plus table values ut[i] and vt[i] respectively. Tables ut[i] and vt[i] are determined in step 1202C. In step 1216, the square of the magnitude of the candidate error vector (cu,cv) is determined, and assigned to the variable cd. Then, in step 1218, this squared magnitude cd is compared with previous least squared magnitude md. If cd is less, then md is assigned the value of cd in step 1222. In addition, new pixel address nk receives the candidate pixel address ky+jt[i], and new error variables nu and nv receive candidate error values cu and cv, respectively. In either case, processing continues with step 1222, in which the index variable i is incremented.

In step 1224, index variable i is tested to determine whether all table entries have been exhausted. If not, then processing continues at step 1210, and the process of steps 1210 through 1224 repeats until the table entries have been exhausted after which, k is assigned new pixel address nk, and error variables eu and ev are assigned new error values nu and nv, respectively in step 1226. Then, in step 1228, pixel coordinate y is incremented, and tested in step 1230 to determine whether all scan lines have been processed. If not, processing continues at step 1204, and the process repeats until all scan lines have been processed.

What is claimed is:

1. A method for generating a halftone screened image from an original image, said method comprising:
    storing a plurality of distinct strips, each of said plurality of distinct strips representing a different portion of an ideal angled screen pattern;
    concatenating ones of said plurality of distinct strips in a sequence forming a generated screen pattern; and
    screening said original image with said generated screen pattern to form said halftone screened image.

2. A method in accordance with claim 1, where said step of screening said original image with said generated screen pattern to form said halftone screened image comprises:
    comparing said generated screen pattern with said original image; and
    generating a marking signal for a marking device based on said comparison between said generated screen pattern and said original image.

3. A method for generating a halftone screened image from an original image, said method comprising:
    storing a plurality of strips, each of said plurality of strips representing a portion of an ideal angled screen pattern;
    concatenating ones of said plurality of strips in a sequence forming a generated screen pattern; and
    screening said original image with said generated screen pattern to form said halftone screened image,
    where said step of concatenating ones of said plurality of strips in a sequence forming a screen pattern further comprises:
    computing an error function based on the difference between the generated screen pattern and an ideal desired screen pattern; and
    selecting a next selected one of said plurality of strips in said sequence so that said error function of one of said plurality of strips combined with the error function of said selected next of said plurality of strips produces the least combined error.

4. A method in accordance with claim 3, wherein said step of computing an error function based on the error between the actual generated screen pattern and an ideal desired screen pattern comprises:
    calculating an error vector between the actual screen sample point and the idealized screen sample point.

5. A method in accordance with claim 4, wherein said step of selecting said next selected one of said plurality of strips in said sequence comprises:

calculating a plurality of accumulated error vectors by combining said calculated error vector with a calculated error vector corresponding to each of said plurality of strips to form a plurality of accumulated error vectors; and selecting one of said plurality of strips corresponding to the least one of said plurality of accumulated error vectors.

6. A method in accordance with claim 3, wherein said step of computing an error function based on the error between the actual generated screen pattern and an ideal desired screen pattern comprises:

calculating an error vector in transformed UV space between the actual screen sample point and the idealized screen sample point.

7. A method in accordance with claim 6, wherein said transformed UV space is further transformed by an affine transformation.

8. A method for generating a halftone screened image from an original image, said method comprising:

storing a plurality of distinct strips, the first of said plurality of distinct strips representing a portion of an ideal angled screen pattern, and the remainder of said plurality of distinct strips being one or more different substrips of said first strip;

concatenating ones of said plurality of distinct strips in a sequence forming a generated screen pattern; and screening said original image with said generated screen pattern to from said halftone screened image.

9. A method in accordance with claim 8, where said step of screening said original image with said generated screen pattern to form said halftone screened image comprises:

comparing said generated screen pattern with said original image; and generating a marking signal for a marking device based on said comparison between said generated screen pattern and said original image.

10. A method for generating a halftone screened image from an original image, said method comprising:

storing a plurality of strips, the first of said plurality of strips representing a portion of an ideal angled screen pattern, and the remainder of said plurality of strips being one or more substrips of said first strip;

concatenating ones of said plurality of strips in a sequence forming a generated screen pattern; and screening said original image with said generated screen pattern to form said halftone screened image, where said step of concatenating ones of said plurality of strips in a sequence forming a screen pattern further comprises:

computing an error function based on the difference between the generated screen pattern and an ideal desired screen pattern; and selecting a next selected one of said plurality of strips in said sequence so that said error function of one of said plurality of strips combined with the error function of said selected next of said plurality of strips produces the least combined error.

11. A method in accordance with claim 10, wherein said step of computing an error function based on the error between the actual generated screen pattern and an ideal desired screen pattern comprises:

calculating the vector components of said error function in UV space between the actual screen sample point and the idealized screen sample point.

12. A method in accordance with claim 11, wherein said step of selecting said next selected one of said plurality of strips in said sequence comprises:

calculating a plurality of error vector components of said error functions corresponding to each of said plurality of strips to form a plurality of accumulated error vector components;

comparing said plurality of accumulated error vector components to said vector components of said error function; and selecting a starting point in said first strip corresponding to a selected substrip based on said comparison of said plurality of accumulated vector components to said error vector components.

13. A method in accordance with claim 10, wherein said step of computing an error function based on the error between the actual generated screen pattern and an ideal desired screen pattern comprises:

calculating said error vector components in transformed UV space between the actual screen sample point and the idealized screen sample point.

14. A method in accordance with claim 13, wherein said transformed UV space is further transformed by an affine transformation.

15. An apparatus for generating a halftone screened image from an original image, said apparatus comprising:

means for storing a plurality of distinct strips, each of said plurality of distinct strips representing a different portion of an ideal angled screen pattern;

means for concatenating ones of said plurality of distinct strips in a sequence forming a generated screen pattern; and means for screening said original image with said generated screen pattern to form said halftone screened image.

16. An apparatus in accordance with claim 15, where said means for screening said original image with said generated screen pattern to form said halftone screened image comprises:

means for comparing said generated screen pattern with said original image; and means for generating a marking signal for a marking device based on said comparison between said generated screen pattern and said original image.

17. An apparatus for generating a halftone screened image from an original image, said apparatus comprising:

means for storing a plurality of strips, each of said plurality of strips representing a portion of an ideal angled screen pattern;

means for concatenating ones of said plurality of strips in a sequence forming a generated screen pattern; and means for screening said original image with said generated screen pattern to form said halftone screened image, where said means for concatenating ones of said plurality of strips in a sequence forming a screen pattern further comprises:

means for computing an error function based on the difference between the generated screen pattern and an ideal desired screen pattern; and means for selecting a next selected one of said plurality of strips in said sequence so that said error function of one of said plurality of strips combined with the error function of said selected next of said plurality of strips produces the least combined error.

18. An apparatus in accordance with claim 17, wherein said means for computing an error function based on the error between the actual generated screen pattern and an ideal desired screen pattern comprises:
   means for calculating an error vector between the actual screen sample point and the idealized screen sample point.

19. An apparatus in accordance with claim 18, wherein said means for selecting said next selected one of said plurality of strips in said sequence comprises:
   means for calculating a plurality of accumulated error vectors by combining said calculated error vector with a calculated error vector corresponding to each of said plurality of strips to form a plurality of accumulated error vectors; and
   means for selecting one of said plurality of strips corresponding to the least one of said plurality of accumulated error vectors.

20. An apparatus in accordance with claim 17, wherein said means for computing an error function based on the error between the actual generated screen pattern and an ideal desired screen pattern comprises:
   means for calculating an error vector in transformed UV space between the actual screen sample point and the idealized screen sample point.

21. An apparatus in accordance with claim 20, wherein said transformed UV space is further transformed by an affine transformation.

22. An apparatus for generating a halftone screened image from an original image, said apparatus comprising:
   means for storing a plurality of distinct strips, the first of said plurality of distinct strips representing a portion of an ideal angled screen pattern, and the remainder of said plurality of distinct strips being one or more different substrips of said first strip;
   means for concatenating ones of said plurality of distinct strips in a sequence forming a generated screen pattern; and
   means for screening said original image with said generated screen pattern to form said halftone screened image.

23. An apparatus in accordance with claim 22, where said means for screening said original image with said generated screen pattern to form said halftone screened image comprises:
   means for comparing said generated screen pattern with said original image; and
   means for generating a marking signal for a marking device based on said comparison between said generated screen pattern and said original image.

24. An apparatus for generating a halftone screened image from an original image, said apparatus comprising:
   means for storing a plurality of strips, the first of said plurality of strips representing a portion of an ideal angled screen pattern, and the remainder of said plurality of strips being one or more substrips of said first strip;
   means for concatenating ones of said plurality of strips in a sequence forming a generated screen pattern; and
   means for screening said original image with said generated screen pattern to form said halftone screened image,
where said means for concatenating ones of said plurality of strips in a sequence forming a screen pattern further comprises:
   means for computing an error function based on the difference between the generated screen pattern and an ideal desired screen pattern; and
   means for selecting a next selected one of said plurality of strips in said sequence so that said error function of one of said plurality of strips combined with the error function of said selected next of said plurality of strips produces the least combined error.

25. An apparatus in accordance with claim 24, wherein said means for computing an error function based on the error between the actual generated screen pattern and an ideal desired screen pattern comprises:
   means for calculating the vector components of said error function in UV space between the actual screen sample point and the idealized screen sample point.

26. An apparatus in accordance with claim 25, wherein said means for selecting said next selected one of said plurality of strips in said sequence comprises:
   means for calculating a plurality of error vector components of said error functions corresponding to each of said plurality of strips to form a plurality of accumulated error vector components;
   means for comparing said plurality of accumulated error vector components to said vector components of said error function; and
   means for selecting a starting point in said first strip corresponding to a selected substrip based on said comparison of said plurality of accumulated vector components to said error vector components.

27. An apparatus in accordance with claim 24, wherein said means for computing an error function based on the error between the actual generated screen pattern and an ideal desired screen pattern comprises:
   means for calculating said error vector components in transformed UV space between the actual screen sample point and the idealized screen sample point.

28. An apparatus in accordance with claim 27, wherein said transformed UV space is further transformed by an affine transformation.

29. A method for generating a screen pattern of a desired screen angle and screen ruling, said method comprising:
   storing a first plurality of strips, each of said first plurality of strips representing a portion of an ideal angled screen pattern angled at said desired screen angle;
   selecting from said first plurality of strips, a second plurality of strips selected responsive to said desired screen ruling; and
   concatenating ones of said second plurality of strips in a sequence forming said generated screen pattern.

30. A method for generating a screen pattern of a desired screen angle and screen ruling, said method comprising:
   storing a strip representing a portion of an ideal angled screen pattern at said desired screen angle;
   selecting from said strip, responsive to said desired screen ruling, one or more substrips of said strip; and concatenating ones of said selected one of said plurality of strips and substrips in a sequence forming a generated screen pattern.

31. An apparatus for generating a screen pattern of a desired screen angle and screen ruling, said apparatus comprising:
- means for storing a first plurality of strips, each of said first plurality of strips representing a portion of an ideal angled screen pattern angled at said desired screen angle;
- means for selecting from said first plurality of strips, a second plurality of strips selected responsive to said desired screen ruling; and
- means for concatenating ones of said second plurality of strips in a sequence forming said generated screen pattern.

32. An apparatus for generating a screen pattern of a desired screen angle and screen ruling, said apparatus comprising:
- means for storing a strip representing a portion of an ideal angled screen pattern at said desired screen angle;
- means for selecting from said strip, responsive to said desired screen ruling, one or more substrips of said strip; and
- means for concatenating ones of said selected one of said plurality of strips and substrips in a sequence forming a generated screen pattern.

* * * * *